(12) United States Patent
Brandenburger et al.

(10) Patent No.: US 9,783,622 B2
(45) Date of Patent: Oct. 10, 2017

(54) COATING SYSTEM FOR CEMENT COMPOSITE ARTICLES

(75) Inventors: Larry B. Brandenburger, Circle Pines, MN (US); T. Howard Killilea, North Oaks, MN (US); Daniel W. DeChaine, Anoka, MN (US); Kevin W. Evanson, Maple Grove, MN (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 1685 days.

(21) Appl. No.: 12/184,029

(22) Filed: Jul. 31, 2008

(65) Prior Publication Data

US 2010/0028696 A1 Feb. 4, 2010

Related U.S. Application Data

(63) Continuation of application No. PCT/US2007/002587, filed on Jan. 30, 2007.

(60) Provisional application No. 60/764,242, filed on Jan. 31, 2006.

(51) Int. Cl.
*C08F 2/48* (2006.01)
*C04B 41/00* (2006.01)
*C04B 41/48* (2006.01)
*C04B 41/52* (2006.01)
*C04B 41/63* (2006.01)
*C04B 41/71* (2006.01)

(52) U.S. Cl.
CPC .............. *C08F 2/48* (2013.01); *C04B 41/009* (2013.01); *C04B 41/483* (2013.01); *C04B 41/52* (2013.01); *C04B 41/63* (2013.01); *C04B 41/71* (2013.01); *Y10T 428/31667* (2015.04)

(58) Field of Classification Search
None
See application file for complete search history.

(56) References Cited

U.S. PATENT DOCUMENTS

| | | |
|---|---|---|
| 2,128,961 A | 9/1938 | Patterson |
| 2,356,542 A | 8/1944 | Sloan |
| 2,633,458 A | 3/1953 | Shokal |
| 2,674,775 A | 4/1954 | Willson |
| 2,727,012 A | 12/1955 | Treat et al. |
| 2,730,517 A | 1/1956 | Vogel et al. |
| 3,010,919 A | 11/1961 | MacKinney et al. |
| 3,049,458 A | 8/1962 | Willard |
| 3,091,551 A | 5/1963 | Robertson |

(Continued)

FOREIGN PATENT DOCUMENTS

| | | |
|---|---|---|
| AU | 198060655 A1 | 3/1981 |
| AU | 2005100347 B4 | 5/2005 |

(Continued)

OTHER PUBLICATIONS

ASTM D6944-03, Test Method A (2003).

(Continued)

*Primary Examiner* — Alicia Chevalier
(74) *Attorney, Agent, or Firm* — Lorenz & Kopf, LLP

(57) ABSTRACT

A coated article which includes a cement fiberboard substrate and a radiation-curable coating system applied to the substrate. The coating system includes one or more olefinic compounds and one or more PVC dispersion resins, and may be provided in the form of one or more coating compositions that may be applied in one or more layers.

20 Claims, 1 Drawing Sheet

(56) References Cited

U.S. PATENT DOCUMENTS

| | | | |
|---|---|---|---|
| 3,219,467 | A | 11/1965 | Redican et al. |
| 3,380,831 | A | 4/1968 | Cohen et al. |
| 3,449,161 | A | 6/1969 | Hindersinn et al. |
| 3,481,894 | A * | 12/1969 | Lima et al. ............... 524/109 |
| 3,655,423 | A | 4/1972 | Lin et al. |
| 3,781,396 | A | 12/1973 | Okuda et al. |
| 3,804,735 | A | 4/1974 | Radlove et al. |
| 3,899,611 | A | 8/1975 | Hall |
| 3,935,173 | A | 1/1976 | Ogasawara et al. |
| 3,935,364 | A | 1/1976 | Prokesh et al. |
| 3,952,032 | A * | 4/1976 | Vrancken et al. ............ 560/127 |
| 3,970,628 | A | 7/1976 | Connelly et al. |
| 3,986,996 | A | 10/1976 | Villa et al. |
| 3,991,136 | A | 11/1976 | Dalton et al. |
| 4,015,040 | A | 3/1977 | Hoshida et al. |
| 4,028,294 | A | 6/1977 | Brown et al. |
| 4,113,893 | A | 9/1978 | Hahn |
| 4,132,526 | A | 1/1979 | Schwarz et al. |
| 4,197,389 | A | 4/1980 | Becker et al. |
| 4,211,848 | A | 7/1980 | Blount |
| 4,228,761 | A | 10/1980 | Glover et al. |
| 4,324,822 | A | 4/1982 | Kobayashi et al. |
| 4,333,867 | A | 6/1982 | Sauntson |
| 4,385,152 | A | 5/1983 | Boyack et al. |
| 4,390,688 | A | 6/1983 | Walz et al. |
| 4,408,018 | A | 10/1983 | Bartman et al. |
| 4,486,553 | A | 12/1984 | Wesch |
| 4,522,962 | A | 6/1985 | Abbey et al. |
| 4,528,307 | A | 7/1985 | Fuhr et al. |
| 4,536,534 | A | 8/1985 | Singer et al. |
| 4,582,755 | A | 4/1986 | Dietrich |
| 4,598,108 | A | 7/1986 | Hoefs |
| 4,719,149 | A | 1/1988 | Aasen et al. |
| 4,737,577 | A | 4/1988 | Brown |
| 4,742,121 | A | 5/1988 | Toman |
| 4,782,109 | A | 11/1988 | DuLaney et al. |
| 4,822,828 | A | 4/1989 | Swofford |
| 4,822,858 | A | 4/1989 | Pivotto et al. |
| 4,852,316 | A | 8/1989 | Webb |
| 4,880,660 | A | 11/1989 | Aasen et al. |
| 4,886,852 | A | 12/1989 | Numa |
| 4,904,522 | A | 2/1990 | Markusch |
| 4,908,229 | A | 3/1990 | Kissel |
| 4,916,004 | A | 4/1990 | Ensminger et al. |
| 5,017,632 | A | 5/1991 | Bredow et al. |
| 5,073,578 | A | 12/1991 | Boodaghains et al. |
| 5,075,370 | A | 12/1991 | Kubitza et al. |
| 5,100,948 | A | 3/1992 | Aydin et al. |
| 5,157,074 | A | 10/1992 | Metzger et al. |
| 5,191,012 | A | 3/1993 | Markusch et al. |
| 5,212,230 | A | 5/1993 | Tirpak et al. |
| 5,221,710 | A | 6/1993 | Markusch et al. |
| 5,236,994 | A | 8/1993 | Markusch et al. |
| 5,262,444 | A * | 11/1993 | Rusincovitch et al. ...... 521/50.5 |
| 5,296,530 | A | 3/1994 | Bors et al. |
| 5,356,716 | A | 10/1994 | Patel |
| 5,371,148 | A | 12/1994 | Taylor et al. |
| 5,407,783 | A | 4/1995 | Caruso |
| 5,409,984 | A | 4/1995 | Gerhardinger et al. |
| 5,418,264 | A | 5/1995 | Obloh et al. |
| 5,426,142 | A | 6/1995 | Rosano et al. |
| 5,461,125 | A | 10/1995 | Lu et al. |
| 5,468,804 | A | 11/1995 | Schmalstieg et al. |
| 5,478,601 | A | 12/1995 | Larson et al. |
| 5,484,849 | A | 1/1996 | Bors et al. |
| 5,500,457 | A | 3/1996 | Sarkar et al. |
| 5,534,310 | A | 7/1996 | Rokowski et al. |
| 5,559,192 | A | 9/1996 | Bors et al. |
| 5,562,953 | A | 10/1996 | Bors et al. |
| 5,567,767 | A | 10/1996 | Smeal et al. |
| 5,569,686 | A | 10/1996 | Makati et al. |
| 5,571,863 | A | 11/1996 | Smeal et al. |
| 5,672,379 | A | 9/1997 | Schall et al. |
| 5,679,721 | A | 10/1997 | Courtoy et al. |
| 5,681,385 | A | 10/1997 | Beckenhauer |
| 5,688,867 | A | 11/1997 | Scheibelhoffer et al. |
| 5,708,077 | A | 1/1998 | Nölken et al. |
| 5,708,093 | A | 1/1998 | Bastelberger et al. |
| 5,718,943 | A | 2/1998 | Hsu et al. |
| 5,744,078 | A * | 4/1998 | Soroushian et al. ............ 264/82 |
| 5,766,768 | A | 6/1998 | Cummings et al. |
| 5,777,053 | A | 7/1998 | McBain et al. |
| 5,780,117 | A | 7/1998 | Swartz et al. |
| 5,798,426 | A | 8/1998 | Anton et al. |
| 5,814,397 | A | 9/1998 | Cagliostro et al. |
| 5,859,095 | A | 1/1999 | Moyle et al. |
| 5,869,590 | A | 2/1999 | Clark et al. |
| 5,874,503 | A | 2/1999 | Scheibelhoffer et al. |
| 5,928,778 | A | 7/1999 | Takahashi et al. |
| 5,945,044 | A | 8/1999 | Kawai et al. |
| 5,962,571 | A | 10/1999 | Overbeek et al. |
| 5,973,068 | A | 10/1999 | Yamaya et al. |
| 5,994,428 | A | 11/1999 | Lutz et al. |
| 5,997,952 | A | 12/1999 | Harris et al. |
| 6,007,619 | A | 12/1999 | Laas et al. |
| 6,008,289 | A | 12/1999 | König et al. |
| 6,011,078 | A | 1/2000 | Reich et al. |
| 6,028,155 | A | 2/2000 | Collins et al. |
| 6,030,447 | A | 2/2000 | Naji et al. |
| 6,045,871 | A | 4/2000 | Matt et al. |
| 6,045,873 | A | 4/2000 | Adachi et al. |
| 6,048,471 | A | 4/2000 | Henry |
| 6,063,864 | A | 5/2000 | Mathur et al. |
| 6,103,352 | A | 8/2000 | Takahashi |
| 6,114,440 | A | 9/2000 | Yamaya et al. |
| 6,136,383 | A | 10/2000 | Schwartz et al. |
| 6,146,710 | A | 11/2000 | Symons |
| 6,146,711 | A | 11/2000 | Courtoy et al. |
| 6,162,511 | A | 12/2000 | Garnett et al. |
| 6,235,228 | B1 | 5/2001 | Nicholl et al. |
| 6,297,320 | B1 | 10/2001 | Tang et al. |
| 6,346,146 | B1 | 2/2002 | Duselis et al. |
| 6,395,827 | B1 | 5/2002 | Pears et al. |
| 6,398,976 | B1 | 6/2002 | Sandoval et al. |
| 6,417,267 | B1 | 7/2002 | Stockl et al. |
| 6,426,414 | B1 | 7/2002 | Laas et al. |
| 6,453,960 | B1 | 9/2002 | Kondo et al. |
| 6,458,250 | B1 | 10/2002 | Holliday et al. |
| 6,475,556 | B1 | 11/2002 | Sobczak et al. |
| 6,485,601 | B1 | 11/2002 | Egan et al. |
| 6,485,793 | B1 | 11/2002 | Ott et al. |
| 6,492,450 | B1 | 12/2002 | Hsu |
| 6,506,248 | B1 | 1/2003 | Duselis et al. |
| 6,528,610 | B1 | 3/2003 | Frouin et al. |
| 6,534,176 | B2 | 3/2003 | Terase et al. |
| 6,555,625 | B1 | 4/2003 | Overbeek et al. |
| 6,590,025 | B1 | 7/2003 | Carlson et al. |
| 6,635,735 | B1 | 10/2003 | Zhang et al. |
| 6,638,567 | B1 | 10/2003 | Beisele |
| 6,638,998 | B2 | 10/2003 | Zhao et al. |
| 6,641,629 | B2 | 11/2003 | Safta et al. |
| 6,649,679 | B1 | 11/2003 | Stockl et al. |
| 6,660,386 | B2 | 12/2003 | Haque |
| 6,696,518 | B1 | 2/2004 | Dersch et al. |
| 6,740,423 | B2 | 5/2004 | Murase |
| 6,753,394 | B2 | 6/2004 | Weikard et al. |
| 6,762,230 | B2 | 7/2004 | Brandenburger et al. |
| 6,777,458 | B1 * | 8/2004 | Jaworek et al. ................. 522/1 |
| 6,818,697 | B2 | 11/2004 | Zhang et al. |
| 6,849,338 | B2 | 2/2005 | Clemens et al. |
| 6,893,751 | B2 | 5/2005 | Naji et al. |
| 6,941,720 | B2 | 9/2005 | DeFord et al. |
| 6,998,012 | B2 | 2/2006 | Koelliker et al. |
| 7,049,352 | B2 | 5/2006 | Gould et al. |
| 7,101,921 | B2 | 9/2006 | Edwards et al. |
| 7,105,593 | B2 | 9/2006 | Solomon et al. |
| 7,148,270 | B2 | 12/2006 | Bowe |
| 7,235,595 | B2 | 6/2007 | Hermes et al. |
| 7,235,603 | B2 | 6/2007 | Madle et al. |
| 7,238,391 | B2 | 7/2007 | Dargontina et al. |
| 7,247,671 | B2 | 7/2007 | Overbeek et al. |
| 7,265,166 | B2 | 9/2007 | Gebhard et al. |
| 7,338,989 | B2 | 3/2008 | Gross et al. |
| 7,381,785 | B2 | 6/2008 | Detrembleur et al. |

(56) References Cited

U.S. PATENT DOCUMENTS

| | | |
|---|---|---|
| 7,449,516 B2 | 11/2008 | Bayer et al. |
| 7,758,954 B2 | 7/2010 | Nguyen et al. |
| 7,812,090 B2 | 10/2010 | Killilea et al. |
| 7,834,086 B2 | 11/2010 | Killilea et al. |
| 2002/0007009 A1 | 1/2002 | Stark et al. |
| 2002/0009622 A1 | 1/2002 | Goodson |
| 2002/0081437 A1 | 6/2002 | Dargontina et al. |
| 2002/0179240 A1 | 12/2002 | Clemens et al. |
| 2002/0195191 A1 | 12/2002 | Weiss et al. |
| 2003/0027915 A1 | 2/2003 | Gerst et al. |
| 2003/0055171 A1 | 3/2003 | Overbeek et al. |
| 2003/0073778 A1 | 4/2003 | Zhang et al. |
| 2003/0089061 A1 | 5/2003 | DeFord et al. |
| 2003/0150359 A1 | 8/2003 | Lassmann |
| 2003/0153673 A1 | 8/2003 | Schwalm et al. |
| 2003/0203991 A1 | 10/2003 | Schottman et al. |
| 2003/0207121 A1 | 11/2003 | McGee |
| 2003/0211346 A1 | 11/2003 | Kausch |
| 2003/0224184 A1 | 12/2003 | Hermes et al. |
| 2004/0002559 A1 | 1/2004 | Troutman et al. |
| 2004/0044094 A1 | 3/2004 | Garnett |
| 2004/0063809 A1 | 4/2004 | Fu et al. |
| 2004/0068045 A1 | 4/2004 | Betremieux et al. |
| 2004/0077782 A1 | 4/2004 | Heldmann et al. |
| 2004/0082715 A1 | 4/2004 | Bayer et al. |
| 2004/0086676 A1* | 5/2004 | Peng ............................ 428/40.1 |
| 2004/0161542 A1 | 8/2004 | Ziemann et al. |
| 2004/0176502 A1 | 9/2004 | Raymond et al. |
| 2004/0198903 A1 | 10/2004 | Madle et al. |
| 2004/0229978 A1 | 11/2004 | Bowe |
| 2005/0009954 A1 | 1/2005 | Gebhard et al. |
| 2005/0020718 A1* | 1/2005 | Gosse et al. .................. 523/105 |
| 2005/0027079 A1 | 2/2005 | Palmer Lauer et al. |
| 2005/0053797 A1 | 3/2005 | Rumph et al. |
| 2005/0126430 A1 | 6/2005 | Lightner, Jr. et al. |
| 2005/0176321 A1* | 8/2005 | Crette et al. .................. 442/103 |
| 2005/0203211 A1 | 9/2005 | Gebhard |
| 2005/0208285 A1 | 9/2005 | Lyons et al. |
| 2006/0013950 A1 | 1/2006 | Porter et al. |
| 2006/0024480 A1 | 2/2006 | Lyons et al. |
| 2006/0046068 A1 | 3/2006 | Barancyk et al. |
| 2006/0048708 A1 | 3/2006 | Hartig |
| 2006/0111503 A1 | 5/2006 | Killilea et al. |
| 2006/0135684 A1 | 6/2006 | Killilea |
| 2006/0135686 A1 | 6/2006 | Kililea et al. |
| 2006/0182946 A1 | 8/2006 | Zarb et al. |
| 2006/0288909 A1 | 12/2006 | Naji et al. |
| 2007/0027233 A1 | 2/2007 | Yamaguchi et al. |
| 2007/0042192 A1 | 2/2007 | Nguyen et al. |
| 2007/0110981 A1 | 5/2007 | Killilea et al. |
| 2007/0149077 A1 | 6/2007 | Stanislawczyk et al. |
| 2007/0213445 A1 | 9/2007 | Klijn et al. |
| 2007/0259166 A1 | 11/2007 | Killilea et al. |
| 2007/0259188 A1 | 11/2007 | Wu et al. |
| 2007/0269660 A1 | 11/2007 | Killilea et al. |
| 2007/0282046 A1 | 12/2007 | Killilea et al. |
| 2008/0008895 A1 | 1/2008 | Garner et al. |
| 2008/0139737 A1* | 6/2008 | Alderfer et al. .............. 524/521 |
| 2008/0141908 A1 | 6/2008 | Peng et al. |
| 2008/0275155 A1 | 11/2008 | Wagner et al. |
| 2008/0300338 A1 | 12/2008 | Wagner et al. |
| 2009/0004468 A1 | 1/2009 | Chen et al. |

FOREIGN PATENT DOCUMENTS

| | | |
|---|---|---|
| CN | 1182724 A | 5/1998 |
| DE | 33 02 767 A1 | 8/1984 |
| EP | 0 060 505 A1 | 9/1982 |
| EP | 0 486 278 A1 | 5/1992 |
| EP | 0 623 659 A2 | 11/1994 |
| EP | 0 640 629 A1 | 3/1995 |
| EP | 0 697 417 A1 | 2/1996 |
| EP | 0 705 855 A2 | 4/1996 |
| EP | 0 725 088 A1 | 8/1996 |
| EP | 0 728 779 B2 | 8/1996 |
| EP | 0 757 059 A1 | 2/1997 |
| EP | 0 894 780 A1 | 2/1999 |
| EP | 1 118 632 A2 | 7/2001 |
| EP | 1 170 340 A1 | 1/2002 |
| EP | 1 454 935 A1 | 9/2004 |
| EP | 1 473 331 A1 | 11/2004 |
| EP | 1 505 088 A1 | 2/2005 |
| EP | 1 505 127 A1 | 2/2005 |
| EP | 1 589 083 A2 | 10/2005 |
| EP | 1 650 045 A2 | 4/2006 |
| EP | 1 798 258 A1 | 6/2007 |
| GB | 1 407 827 | 9/1975 |
| GB | 2 148 871 A | 6/1985 |
| JP | 54 038323 | 3/1979 |
| JP | 01 229242 | 9/1989 |
| JP | 02 308887 | 12/1990 |
| JP | 08 059939 | 3/1996 |
| JP | 11 236281 | 8/1999 |
| JP | 03 44986 A | 12/2000 |
| JP | 2003 226835 A | 8/2003 |
| JP | 2003251269 | 9/2003 |
| JP | 2004 010805 A | 1/2004 |
| JP | 2004 250607 A2 | 9/2004 |
| JP | 2004 292748 A2 | 10/2004 |
| JP | 2005-307161 | 4/2005 |
| JP | 2006 117812 | 5/2006 |
| SU | 833892 | 5/1981 |
| WO | WO 94/07674 A1 | 4/1994 |
| WO | WO 94/25499 A1 | 11/1994 |
| WO | WO 98/45222 | 10/1998 |
| WO | WO 99/67312 | 12/1999 |
| WO | WO 00/23495 A1 | 4/2000 |
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO 2005/071179 A1 | 8/2005 |
| WO | WO 2006/032512 A | 3/2006 |
| WO | WO 2006/065914 A1 | 6/2006 |
| WO | PCT/US2006/060943 | 11/2006 |
| WO | PCT/US2007/002587 | 1/2007 |
| WO | PCT/US2007/002802 | 1/2007 |
| WO | PCT/US2007/061326 | 1/2007 |
| WO | PCT/US2007/61327 | 1/2007 |
| WO | PCT/US2007/069387 | 5/2007 |
| WO | WO 2007/059516 A1 | 5/2007 |
| WO | PCT/US2007/070356 | 6/2007 |
| WO | PCT/US2007/073070 | 7/2007 |
| WO | PCT/US07/074991 | 8/2007 |
| WO | WO 2007/087458 A1 | 8/2007 |
| WO | WO 2007/089807 A2 | 8/2007 |
| WO | WO 2007/089913 A1 | 8/2007 |
| WO | WO 2007/090132 A1 | 8/2007 |
| WO | WO 2008/018910 A2 | 2/2008 |
| WO | PCT/US2009/065811 | 11/2009 |

OTHER PUBLICATIONS

Koleske et al., *Two Thousand Three Additives Guide*, Paint and Coatings Industry, pp. 12-86, (Apr. 2003).

Witzeman, J. S. et al., *Comparison of Methods for the Preparation of Acetoacetylated Coating Resins*, Coatings Technology; vol. 62, No. 789, pp. 101-112 (Oct. 1990).

American Society of Testing Materials, ASTM Designation: D523-89, "Standard Test Method for Specular Gloss;" 5 pages, (Reapproved 1999).

American Society of Testing Materials, ASTM Designation: D5402-93, "Standard Practice for Assessing the Solvent Resistance of Organic Coatings Using Solvent Rubs;" 3 pages, (Reapproved 1999).

Eastman Chemical Company, Publications N-319C, Kingport, TN., Title Page, Table of Contents, "Acetoacetoxyethyl Methacrylate (AAEM) Acetoacetyl Chemistry," pp. 1-11, (Dec. 1999).

Lewis et al., "Luminescence", Hawley's Condensed Chemical Dictionary, 14th Ed., John Wiley and Sons, Inc., retrieved from Knovel® online; 1 page (2002).

(56) References Cited

OTHER PUBLICATIONS

"Photoinitiators for UV Curing," "Darocur 1173", p. 2; Ciba Specialty Chemicals; 8 pages (2003).
U.S. Federal Register, vol. 60, No. 116, pp. 31633-31637, (Jun. 16, 1995).
Wicks, Zeno W. Jr., et al., "Latexes", Organic Coatings, Science and Technology, Second Edition, (Wiley-Interscience, New York), Title Page, Copyright Page, Chapter 8, p. 143, (1999).
Dow® Z-6018 Intermediate Product Information, "Silicone Intermediates", 3 pgs., (Aug. 28, 2006).
ISR and Written Opinion for PCTUS/2007/002587 dated Aug. 13, 2007.
ASTM D6944-03, Test Method A.
Koleske et al., *Two Thousand Three Additives Guide*, Paint and Coatings Industry, Apr. 2003, pp. 1-76.
Witzeman, J. S. et al., Comparison of Methods for the Preparation of Acetoacetylated Coating Resins, Coatings Technology; vol. 62, No. 789, Oct. 1990, pp. 101-112 (and references contained therein).
Clemens, R. J. et al., *A Comparison of Catalysts for Crosslinking Acetoacetylated Resins via the Michael Reaction*, Journal of Coatings Technology, Mar. 1989, vol. 61, No. 770, pp. 83-91.
Clemens, R. J., *A Comparison of Catalysts for Crosslinking Acetoacetylated Resins via the Michael Reaction*, Water-Borne & Higher Solids Coatings Symposium, 1988, New Orleans, LA, 55-67.
Wicks, Z.W. et al., *Epoxy and Phenolic Resins*, Organic Coatings Science and Technology, vol. 1, Chapter XI, pp. 162-187.
Tennebroek et al., *New Polymer Synthesis for (self) Crosslinkable Urethanes and Urethane Acrylics*, 4th Nürnberg Congress; International Centre for Coatings Technology, Paper 17, 2000, 19 pages.
Geurts, J.M. et al., *Self-crosslinkable Urethanes and Urethane/Acrylics*, Verfkroniek Nummer, Jan. 1999.
Geon® Lo-Sope Dispersion Resin, Geon® 171 Vinyl Chloride Homopolymer Technical Data Sheet, PolyOne Corporation, May 2003, 2 pages.
Geon Copolymer Dispersion Resin Geon® 137 Vinyl Chloride Copolymer Technical Data Sheet, PolyOne Corporation, Apr. 1997, 2 pages.
Industrial Research Services, *Test Report No. 54703-1 for Epirez Safe Step 100*, CSIRO, Manuf. & Infrastr. Technology, Australia, May 2004, pp. 1-6.
DSM NeoResins, Technical Data Sheet, DSM NeoResins Inc., Bulletin XK-90, Jan. 2006, 6 pages.
Tex•Cote® Stretch Product Information, Textured Coatings of America, Inc., Panama City, Florida, Nov. 2003, 3 pages.
UCAR Emulsion Systems Applications, Architectural Coatings-Exterior-Cement Fiber Board, Dow Chemical Company product information sheet printed on Oct. 25, 2007 from the following Internet archives website at: http://web.archive.org/web/20041022123748/http://www.dow.com/ucarlatex/app/arch/ex_fiber.htm.
Rector, F.D. et al., *Applicatons for the Acetoacetyl Chemistry in Thermoset Coatings*, Journal of Coatings Technology, vol. 61, No. 771, Apr. 1989.
"UV Cured Undercoat Vitrecure 7", Product Data Sheet 74, Architectural & Industrial Coatings, 1 page (Dec. 21, 2004).
"UV Cured Sealer for Cement Based Substrates Vitrecure 9", Product Data Sheet 54, Architectural & Industrial Coatings, 1 page (Jul. 24, 2004).
Fox, T. G., "Influence of diluent and of copolymer composition on the glass temperature of a polymer system", Bull. Am. Phys. Soc. I (3), 123 (1956).
PQ® Potassium Silicates, PQ Corporation Brochure, (2004).
"Ancarez AR550 Waterborne Epoxy Resin Technical Bulletin", Air Products and Chemicals, Inc., High Performance Coatings Resins, Pub. No. 125-9914, 13 pages, (Mar. 2006).
"Anquamine 401 Curing Agent Technical Bulletin", Air Products and Chemicals, Inc., Epoxy Curing Agents and Modifiers, Publication No. 125-9744, 1 page, (May 2004).

"Polycat 41 Catalyst", Product Information Sheet, Air Products and Chemicals, Inc., 2 pages, (2003).
Hardiplank™ Lap Siding Installation, James Hardie Siding Products, 8 pages, (Dec. 2005), http://www.jameshardie.com/homeowner/technical/installation/hardieplank_installation.php, downloaded from the Dec. 15, 2005 Internet Archive entry at: http://web.archive.org/web/20051215084041/http://www.jameshardie.com/homeowner/installation/hardiplank_installation.php.
"Siding Painting Tips", Paint Manufacturers' Recommendation Sheet—No. S-100, James Hardie Siding Products, 10 pages, (May 2005), http://www.jameshardie.com/homeowner/technical/paintingtips.php, downloaded from the Dec. 14, 2005 Internet Archive entry at: http://web.archive.org/web/20051214022056/http://www.jameshardie.com/homeowner/technical/paintingtips.php.
U.S. Appl. No. 11/669,131, filed Jan. 30, 2007, Killilea et al.
U.S. Appl. No. 11/669,134, filed Jan. 30, 2007, Wu et al.
U.S. Appl. No. 11/590,329, filed Nov. 15, 2006, Killilea et al.
U.S. Appl. No. 12/183,975, filed Jul. 31, 2008, Brandenburger et al.
U.S. Appl. No. 12/184,150, filed Jul. 31, 2008, Killilea et al.
U.S. Appl. No. 11/751,459, filed May 21, 2007, Killilea et al.
U.S. Appl. No. 12/905,815, filed Oct. 15, 2010, Killilea et al.
U.S. Appl. No. 12/905,815, filed Oct. 15, 2010, Garner et al.
U.S. Appl. No. 12/032,213, filed Feb. 15, 2008, Vetter et al.
U.S. Appl. No. 12/671,491, filed Jan. 29, 2010, Brandenburger et al.
U.S. Appl. No. 13/131,005, filed May 24, 2011, Killilea et al.
Epoxy Resins Chemistry and Technology 2nd Edition, Revised and Expanded—Tanaka, Yoshio: Synthesis and Characteristics of Epoxides, p. 54 (1988).
"*ASTM C920-11 Standard Specification for Elastomeric Joint Sealants*" Abstract, Book of Standards, 2 pages, (vol. Apr. 2007).
"*ASTM C834-10 Standard Specification for Latex Sealants*" Abstract, Book of Standards, 2 pages, (vol. Apr. 2007).
Gardner's Commercially Important Chemicals, edited by G.W.A Milne, Wiley, p. 573 (2005).
NaH2PO4 MSDS, found at http://muby.itgo.com/MSDS/sodium_phosphate_monobasic_anhyd%20MSDS.htm.
Araujo, P.H.H. et al., "Techniques for Reducing Residual Monomer Content in Polymers: A Review", Polymer Engineering and Science, vol. 42, No. 7, pp. 1442-1468 (Jul. 2002).
Michigan State University Extension-Home Maintenance and Repair: Paint Problems, Jun. 24, 2003 and can be found at: http://www.msue.msu.edu/objects/content_revision/download.cfm/revision_id.498884/workspace_id.-4/01500572.html/.
EPS 4203 Technical Data Sheet (May 25, 2011).
EPS 4203 Material Safety Data Sheet (May 10, 2013).
EPS 4213 Technical Data Sheet (May 26, 2011).
EPS 4213 Material Safety Data Sheet (May 10, 2013).
Technical Bulletin CC 2.0, "Yellowing of Alkyd Paints", Glidden Professional™, Akzo Nobel Paints LLC, 2 pages. (Feb. 2010).
Lux 399 Technical Data Sheet (Dec. 15, 2010).
Lux 399 Material Safety Data Sheet (Apr. 29, 2011).
Celanese Emulsions, "Brilliant Aspects" Technical Data Sheets (Feb. 2005).
MaxiTile, Inc. Limited Warranty, MaxiLite P7 and P10, MaxiShake and MaxiSlate, SlateMax and ShakeMax, and SuperTile PVA Reinforced Roofing, 2 pages (2005).
Celanese Emulsions, "Mowilith LDM 7416" Technical Data Sheets, Version 1, 2 pages, Issue 2005/02.
Celanese Emulsion Polymers, "Mowilith LDM 7416" Technical Data Sheet, 2 pages, (Jan. 8, 2013).
Celanese Emulsions—Wood Coatings, "Industrial Wood Coatings" sheet downloaded on Aug. 2, 2013 from the Internet Archives at: http://web.archive.org/web/20061016145419/http://www.celanese.com/i.
Dach-Und Fassadenschindeln, Eternit, Preisliste 2002, 4 pages (Jan. 2002).
Highly Durable Non-Abrasive Roof Tiles, pp. 52-56, (May 2004).
Wir bei Etemit Information Sheets, 2 pages, (Aug. 1998).

* cited by examiner

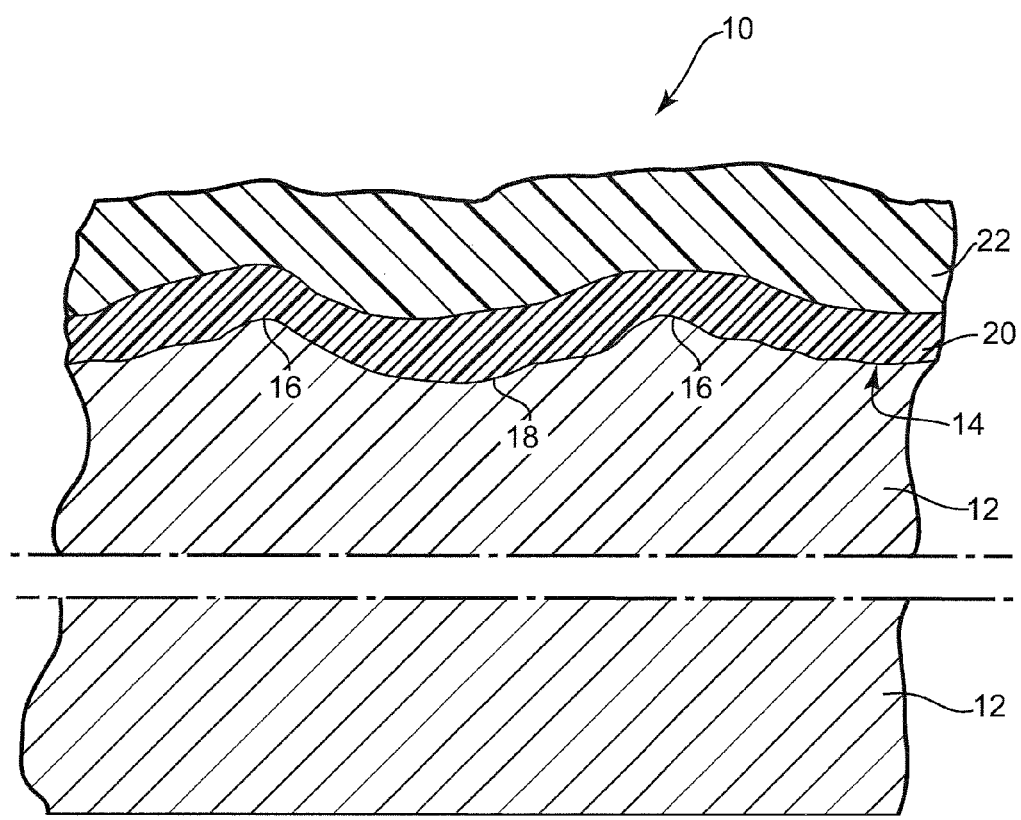

ns, and from the claims.

COATING SYSTEM FOR CEMENT COMPOSITE ARTICLES

CROSS-REFERENCE TO RELATED APPLICATION

This application is a continuation of International Application No. PCT/US2007/002587, filed on Jan. 30, 2007, which claims priority from U.S. provisional patent application Ser. No. 60/764,242, filed Jan. 31, 2006, the disclosures of which are incorporated herein by reference.

BACKGROUND

Cement composite articles are becoming more and more common for use in building materials. Many of these articles are prepared from inexpensive materials, such as cement, wood (cellulose) fibers, natural (glass) fibers and polymers. These articles usually are prepared in the form of cement fiberboard substrates such as siding panels and boards. The substrate or articles can be made using methods such as extrusion or using a Hatschek machine.

In northern climates, damage from repeated freezing and thawing of water absorbed into the cement fiberboard substrate represents a significant problem. Continued exposure to moisture, freeze-thaw cycles, UV exposure and atmospheric carbon dioxide can cause physical and chemical changes in articles made from cement fiberboard compositions over time. Coating systems or coating compositions can prevent exposure to the elements such as UV light, carbon dioxide and water, or can help reduce the damage that can occur due to exposure to these elements. Several such systems are available for protecting cement fiberboard articles. However, there is a need for coating systems and coating compositions that provide a superior seal, have the ability to cure rapidly or can provide improved results when an article coated with the composition is submitted to wet adhesion testing and multiple freeze-thaw cycles.

SUMMARY

The present invention provides in one aspect a coated article comprising a cement fiberboard substrate and a radiation-curable coating system applied to the substrate, wherein the coating system comprises one or more olefinic compounds and one or more polyvinyl chloride (PVC) dispersion resins. The disclosed coating system may be applied in one or more layers, may be substantially free of volatile solvents or carriers, or may optionally include a photoinitiator system.

In another aspect, the invention provides a method for preparing a coated article, which method comprises providing a cement fiberboard substrate, coating at least a portion of the substrate with the above-described coating system and radiation-curing the coating.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawing and the description below. Other features, objects, and advantages of the invention will be apparent from the description and drawings, and from the claims.

BRIEF DESCRIPTION OF THE DRAWING

FIG. 1 is a schematic cross-sectional view of a coated fiber cement article.

Like reference symbols in the various figures of the drawing indicate like elements. The elements in the drawing are not to scale.

DETAILED DESCRIPTION

The terms "a," "an," "the," "at least one," and "one or more" are used interchangeably.

The recitation of numerical ranges by endpoints includes all numbers subsumed within that range (e.g., 1 to 5 includes 1, 1.5, 2, 2.75, 3, 3.80, 4, 5, etc.).

The term "comprises" and variations thereof does not have a limiting meaning where such term appears in the description or claims. Thus, for example, a composition comprising a wax compound means that the composition includes one or more wax compounds.

The terms "acrylate esters" and "methacrylate esters" refer to esters of acrylic acid and esters of methacrylic acid, respectively. They may be referred to as (meth)acrylates or (meth)acrylate esters.

The term "olefinic compound" refers to any monomer, oligomer or polymer containing reactive ethylenic unsaturation, such as vinyls, (meth)acrylates, vinyl ethers, allyl ethers, vinyl esters, unsaturated oils (including mono, di and triglycerides), unsaturated fatty acids, and the like. The term "olefinic group" refers to the reactive ethylenic unsaturated functional group in an olefinic compound.

The term "reactive sites" or "reactive groups" refers to a group that can react to form a covalent bond linking or otherwise chemically joining two or more molecules.

The present invention provides a coating system for a cement fiberboard substrate, such as a cement fiberboard siding product or other cement composite article. The coating system is a radiation-curable coating system applied to the substrate, wherein the coating system includes one or more olefinic compounds and one or more PVC dispersion resins. The disclosed coating system includes one or more coating compositions that may be applied in one or more layers.

Referring to FIG. 1, a coated article 10 of the present invention is shown in schematic cross-sectional view. Article 10 includes a cement fiberboard substrate 12. Substrate 12 typically is quite heavy and may for example have a density of about 1 to about 1.6 g/cm$^3$ or more. The first major surface 14 of substrate 12 may be embossed with small peaks or ridges 16 and valleys 18, e.g., so as to resemble roughsawn wood. Major surface 14 may have a variety of other surface configurations, and may resemble a variety of building materials other than roughsawn wood. Layer or layers 20 of the disclosed coating system lie atop and partially penetrate surface 14, and desirably are applied to article 10 at the location where article 10 is manufactured. Layers 20 help to protect substrate 12 against one or more of exposure to moisture, freeze-thaw cycles, UV exposure or atmospheric carbon dioxide. Layers 20 also may provide a firmly-adhered base layer upon which one or more firmly-adhered layers of final topcoat 22 may be formed. Final topcoat 22 desirably is both decorative and weather-resistant, and may be applied to article 10 at the location where article 10 is manufactured or after article 10 has been attached to a building or other surface.

The disclosed articles may be coated on one or more surfaces with the disclosed radiation-curable coating system. The coating system includes one or more coating compositions that may be applied in one or more layers. The coating systems may be provided in a variety of embodiments. In one exemplary embodiment, the coating system includes a first coating composition that includes at least one olefinic compound, and a second coating composition that includes at least one PVC dispersion resin. The two coating compositions may be applied to the substrate sequentially or concurrently and sequentially or simultaneously cured using radiation. In another exemplary embodiment the coating system includes at least one olefinic compound and at least one PVC dispersion resin, and may be applied to the substrate and cured using radiation. The disclosed coating systems have particular utility for coating the bottom surface of a cement fiberboard article while it is being transported on a conveying system (e.g., on belts, rollers, air tables or the like), as described in applicants' copending PCT Application Ser. No. PCT/US2007/061327, filed Jan. 30, 2007 and entitled METHOD FOR COATING A CEMENT FIBERBOARD ARTICLE.

The olefinic compound in the disclosed coating systems appears to function as a reactive penetrant. This may be better appreciated by observing the coating system after it is applied to the substrate but before radiation curing is performed. The olefinic compound appears to improve wetting or penetration, and may help draw other components in the coating system into pores in the substrate. The olefinic compound also appears to help the cured coating adhere to the substrate following cure. The PVC dispersion resin appears to limit wetting or penetration, and may help prevent other components in the coating system from penetrating so deeply into pores in the substrate that they can not be sufficiently radiation cured. The PVC dispersion resin also appears to help subsequently applied coatings (e.g., a topcoat) adhere to the coated substrate.

Preferred coating systems may also include one or more of the following additional features:
increasing the resistance of the article to water uptake (into the article);
increasing the surface integrity of the article (e.g., by acting to reinforce the fiber and cement matrix much like binder in other composite materials);
protecting against expansion of the article under freeze/thaw conditions; or
increasing the integrity of the edges of the article by binding the fiber layers together.

A variety of cement fiberboard substrates may be employed in the disclosed articles. The disclosed substrates typically include cement and a filler. Exemplary fillers include wood, fiberglass, polymers or mixtures thereof. The substrates can be made using methods such as, extrusion, the Hatschek method, or other methods known in the art. See, e.g., U.S. Patent Application No. 2005/0208285 A1 (corresponds to International Patent Application No. WO 2005/071179 A1); Australian Patent Application No. 2005100347; International Patent Application No. WO 01/68547 A1; International Patent Application No. WO 98/45222 A1; U.S. Patent Application No. 2006/0288909 A1; and Australian Patent Application No. 198060655 A1. Non-limiting examples of such substrates include siding products, boards and the like, for uses including fencing, roofing, flooring, wall boards, shower boards, lap siding, vertical siding, soffit panels, trim boards, shaped edge shingle replicas and stone or stucco replicas. One or both major surfaces of the substrate may be profiled or embossed to look like a grained or roughsawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

A variety of olefinic compounds may be used in the disclosed coating systems. The olefinic compounds are distinct from the PVC dispersion resins, and are carbon containing compounds having at least one site of unsaturation which can react, optionally in the presence of an initiator, to provide polymeric or crosslinked products. Non-limiting examples of olefinic compounds include monomers such as (meth)acrylates, vinyls, vinyl ethers, allyl ethers, vinyl esters, unsaturated oils (including mono-, di- and tri-glycerides), unsaturated fatty acids, and the like or mixtures thereof. The olefinic compounds also include oligomers or polymers having at least one site of unsaturation which can react, optionally in the presence of an initiator, to provide polymeric or crosslinked products.

Exemplary olefinic monomers include (meth)acrylate esters of unsubstituted or substituted $C_1$-$C_{15}$ alcohols such as tripropylene glycol, isobornyl alcohol, isodecyl alcohol, phenoxyethyl alcohol, trishydroxyethyl isocyanurate, trimethylolpropane ethoxylate, ditrimethylolpropane ethoxylate, hexanediol, ethoxylated neopentyl glycol, propoxylated neopentyl glycol, ethoxylated phenol, polyethylene glycol, bisphenol A ethoxylate, trimethylolpropane, propoxylated glycerol, pentaerythritol, tetrahydrofurfuryl alcohol, β-carboxyethyl alcohol, or combination thereof. For example, the olefinic monomer may be isobornyl (meth)acrylate, isodecyl (meth)acrylate, phenoxyethyl (meth)acrylate, trimethylolpropane tri(meth)acrylate, alkoxylated cyclohexane dimethanol di(meth)acrylate, trimethylolpropane ethoxylate tri (meth)acrylate, dipropylene glycol di(meth)acrylate, tripropylene glycol di(meth)acrylate, hexanediol di(meth) acrylate, tetrahydrofurfuryl (meth)acrylate, pentaerythritol tri(meth)acrylate, pentaerythritol tetra(meth)acrylate, ditrimethylolpropane tetra(meth)acrylate, propoxylated glycerol tri(meth)acrylate, beta-carboxyethyl (meth)acrylate, bisphenol A ethoxylate di(meth)acrylate, ethoxylated neopentyl glycol di(meth)acrylate, propoxylated neopentyl glycol di(meth)acrylate, or combination thereof. Preferred olefinic monomers include trimethylolpropane tri(meth) acrylate, bisphenol A ethoxylate di(meth)acrylate, propoxylated glycerol tri(meth)acrylate, trimethylolpropane ethoxylate tri(meth)acrylate, ditrimethylolpropane tetra(meth) acrylate, or combination thereof. The olefinic monomer may contain a ($C_1$-$C_{15}$) alcohol radical such as hydroxymethyl, 1-hydroxyethyl, 2-hydroxyethyl, 1-hydroxypropyl, 2hydroxypropyl, 3-hydroxypropyl, 1-hydroxybutyl, 4-hydroxybutyl, 1-hydroxypentyl, 5hydroxypentyl, 1-hydroxyhexyl, 6-hydroxyhexyl, 1,6-dihydroxyhexyl, 1,4-dihydroxybutyl, and the like.

Exemplary allyl ether monomers contain one or more allyl ether groups which typically are bonded to a core structural group which can be based on a wide variety of polyhydric alcohols. Non-limiting examples of suitable polyhydric alcohols include neopentyl glycol, trimethylolpropane, ethylene glycol, propylene glycol, butylene glycol, diethylene glycol, trimethylene glycol, triethylene glycol, trimethylolethane, pentaerythritol, glycerol, diglycerol, 1,4-butanediol, 1,6-hexanediol, 1,4-cyclohexanedimethanol, and any of the other polyols mentioned above in connection with the (meth)acrylate esters. Other exemplary allyl ether monomers include hydroxyethyl allyl ether, hydroxypropyl allyl ether, trimethylolpropane monoallyl ether, trimethylolpropane diallyl ether, trimethylolethane monoallyl ether, trimethylolethane diallyl ether, glycerol monoallyl ether, glycerol diallyl ether, pentaerythritol monoallyl ether, pentaerythritol diallyl ether, pentaerythritol triallyl ether, 1,2,6-hexanetriol monoallyl ether, 1,2,6-hexanetriol diallyl ether, and the like. Preferred allyl ethers include poly propoxylated and ethoxylated forms of allyl ethers.

Exemplary vinyl ether monomers contain one or more vinyl ether groups and include 4-hydroxybutyl vinyl ether, 1,4-cyclohexanedimethanol monovinyl ether, 1,4-cyclohexanedimethanol divinyl ether, ethylene glycol monovinyl ether, ethylene glycol divinyl ether, diethylene glycol monovinyl ether, diethylene glycol divinyl ether, triethylene glycol divinyl ether, and the like. Preferred vinyl ether monomers include propoxylated or ethoxylated forms of vinyl ether monomers.

The olefinic compounds can include latex polymers or polyurethane dispersions having attached olefinic groups. These compounds can be prepared as described in applicants' copending PCT Application Serial No. PCT/US2007/061326, filed Jan. 30, 2007 and entitled COATING SYSTEM FOR CEMENT COMPOSITE ARTICLES.

A subset of the previously mentioned olefinic compounds (e.g., hexanediol di(meth)acrylate, trimethylolpropane tri (meth)acrylate and di-(trimethylolpropane tetra(meth)acrylate) have multiple (e.g., two or more) reactive groups. These monomers or oligomers can function as crosslinking agents.

The disclosed coating systems or coating compositions preferably contain about 20 to about 95% by weight of olefinic compounds based on the total weight of the non-volatile components in the coating system, preferably about 30 to about 90% by weight and most preferably about 50 to about 80% by weight.

A variety of PVC dispersion resins may be used in the disclosed coating systems and method. A PVC dispersion resin typically contains resin particles (or a mixture of particles of various resins or mixed resins) in a liquid plasticizer. The PVC dispersion resin may for example include a PVC homopolymer, copolymer or a combination thereof, and various additives. PVC dispersion resins can be made by emulsion polymerization, microsuspension polymerization or by a process borrowing from both techniques. PVC dispersion resins typically have very fine particles (e.g., an average particle diameter of about 0.1 µm to about 1.5 µm). Typically, the PVC dispersion resin particles show little or no porosity and have very high surface area. When sufficient plasticizer is added to a dispersion resin (e.g., about 40 phr or higher) a liquid suspension which may be called a plastisol or organosol is obtained. Copolymers of vinyl chloride and other monomers such as acetates and acrylates can be used to produce dispersion resins. PVC dispersion resins are typically produced by suspension polymerization and have an average particle size range of about 25µm to 75µm. Exemplary commercially available PVC dispersion resins include GEON™ resins (e.g., GEON 137, 171, and 172) from PolyOne Corporation, Avon Lake, OH and NORVINYL™ resins (e.g., NORVINYL S6261, S6571, S7060 and S8060) from Hydro Polymers, Oslo, Norway.

The disclosed coating systems or coating compositions preferably contain about 5 to about 80% by weight PVC dispersion resin based on the total weight of the non-volatile components in the coating system, more preferably about 10 to about 70% by weight and most preferably about 20% to about 50% by weight.

The disclosed coating systems may include one or more optional silicates (e.g., a silicate salt). Exemplary silicates include lithium silicate, potassium silicate, sodium silicate, ammonium silicate and the like. The amount of silicate may for example be from about 2 to about 50% by weight, from about 5 to about 40% by weight or from about 10 to about 35% by weight, based on the total weight of the non-volatile components. Silicates are available through a variety of chemical suppliers, for example potassium silicate is available from The PQ Corporation, Valley Forge, Pa.

Wet adhesion testing and "freeze-thaw" cycles have been shown, under laboratory conditions, to simulate long-term outdoor exposure encountered in northern climates. A Wet Adhesion Test may be carried out as follows to evaluate adhesion of the coating system after a coated cement fiberboard substrate has been saturated with water. According to this test procedure, coated substrates (e.g., fiber cement boards) are soaked in room temperature water for 24 hours. After soaking, the boards are removed from the water and kept at room temperature for 24 hours. A six-inch (15.24 cm) length of 3M HD 250 tape is applied to the surface of the board with the long axis of the tape in the direction of any embossing patterns that may be present. The tape is firmly pressed onto the board ensuring full contact. The tape is then removed by quickly pulling it off at a 90-degree angle to the board. "Wet Adhesion" performance is rated based on the percent of coating removed from the cement board. Performance is further assessed by noting where any failure occurs. For example, failure may occur between interfacial coating layers, between the coating and the surface of the board, or within the board itself. Preferred coating systems or coating compositions typically have less than 25% coating removal, more preferably less than 15% coating removal. In addition, the failure preferably is within the board as indicated by a significant amount of fiber from the board adhering to the removed coating.

Preferred coated articles can withstand at least 30 freeze-thaw cycles, when tested according to ASTM D6944-03, Test Method A. As written, this ASTM test method recites a 30-cycle sequence. However, rather than simply grade a specimen as a "pass" at the end of 30 cycles, the test desirably is lengthened to include additional cycles. More preferably, the coated articles can withstand at least 75 freeze-thaw cycles, most preferably at least 125 freeze-thaw cycles and optimally at least 175 freeze-thaw cycles.

The disclosed coating systems or coating compositions preferably have improved, viz., lower, volatile organic content (VOC). The coating systems or coating compositions desirably have a VOC of less than about 5%, based on the total weight of the coating system, preferably a VOC of less than about 2%, more preferably a VOC of less than about 0.5%.

The olefinic compounds are curable by radiation, e.g., visible light, ultra violet light, electron beam, microwave, gamma radiation, infrared radiation and the like. An initiator system is not required for electron beam curing but for other radiation sources typically will be chosen based on the particular type of curing energy (e.g., UV, visible light or other energy) and cationic, free-radical, cationic or other curing mechanism) employed. Thus in one preferred embodiment, the coating system is electron beam curable and does not require an initiator. In another preferred embodiment, the coating system is UV curable and free-radically polymerizable, and includes a UV photoinitiator system which generates free radicals in response to UV light and thereby cures the coating.

Non-limiting examples of initiators include peroxide compounds, azo compounds, cationic-generating initiators, cleavage-type initiators, hydrogen abstraction-type initiators, and the like. Exemplary peroxide compounds include t-butyl perbenzoate, t-amyl perbenzoate, cumene hydroperoxide, t-amyl peroctoate, methyl ethyl ketone peroxide, benzoyl peroxide, cyclohexanone peroxide, 2,4-pentanedione peroxide, di-t-butyl peroxide, t-butyl hydroperoxide and di-(2-ethylhexyl)-peroxydicarbonate. Preferably, the curing agent is t-butyl perbenzoate, methyl ethyl ketone peroxide, or cumene hydroperoxide. Methyl ethyl ketone peroxide conveniently is employed as a solution in dimethyl phthalate, e.g., LUPERSOL™ DDM-9 from Ato-Chem.

Exemplary azo compounds include 2,2-azo bis-(2,4-dimethylpentane-nitrile), 2,2-azo bis-(2-methylbutanenitrile) and 2,2-azo bis-(2-methylpropanenitrile).

Exemplary cationic-generating photoinitiators include super acid-generating photoinitiators such as triaryliodonium salts, triarylsulfonium salts and the like. A preferred triarylsulfonium salt is triphenyl sulfonium hexafluorophosphate.

Exemplary cleavage-type photoinitiators include α,α-diethoxyacetophenone (DEAP); dimethoxyphenylacetophenone (IRGACURE™ 651); hydroxycyclo-hexylphenylketone (IRGACURE™ 184); 2-hydroxy-2-methyl-1-phenylpropan-1-one (DAROCUR™ 1173); a 25:75 blend of bis-(2,6-dimethoxybenzoyl)-2,4,4-trimethylpentyl phosphine oxide and 2-hydroxy-2-methyl-1-phenylpropan-1-one (IRGACURE™ 1700), a 50:50 blend of hydroxycyclohexylphenylketone and benzophenone (IRGACURE™ 500), 50:50 blend of 2,4,6-trimethylbenzoyl-diphenyl-phosphineoxide and 2-hydroxy-2-methyl-1-phenyl-propan-1-one (DAROCUR™ 4265), bis acryl phosphine (IRGACURE™ 819) and phosphine oxide (IRGACURE™ 2100), all available from Ciba Corporation, Ardsley, N.Y. Other cleavage-type initiators include 2,4,6-trimethylbenzoyl-diphenyl-phosphine oxide (LUCIRIN™ TPO) from BASF Corporation and a 70:30 blend of oligo 2-hydroxy-2-methyl-[4-(1-methylvinyl)phenyl]propan-1-one and 2-hydroxy-2-methyl-1-phenylpropan-1-one (KIP™ 100) available from Sartomer (Exton, Pa.). Preferred cleavage-type photoinitiators are hydroxycyclo-hexylphenylketone, 2-hydroxy-2-methyl-1-phenylpropan-1-one, benzophenone, 2,4,6-trimethylbenzoyl-diphenylphosphine oxide bis acryl phosphine and a 70:30 blend of 2-hydroxy-2-methyl-[4-(1-methylvinyl)phenyl]propan-1-one and 2-hydroxy-2-methyl-1-phenylpropan-1-one.

Non-limiting examples of hydrogen abstraction-type photoinitiators include benzophenone, substituted benzophenones (e.g., ESCACURE™ TZT of Fratelli-Lamberti) and other diaryl ketones such as xanthones, thioxanthones, Michler's ketone, benzil, quinones and substituted derivatives of all of the above. Camphorquinone is an example of a compound that may be used when one desires to cure a coating system with visible light.

For coating compositions or systems having an olefinic compound including a mixture of two or more of a (meth)acrylate, an allyl ether and a vinyl ether functional group, a combination of curing procedures can be used. For example, a coating composition having a (meth)acrylate and a vinyl ether functional group typically may include an α-cleavage-type or hydrogen abstraction type photoinitiator for polymerization of the (meth)acrylate groups and a cationic-generating photoinitiator for polymerization of the vinyl ether groups.

If desired, the coating composition or system may also include a co-initiator or photoinitiator synergist. Non-limiting examples of co-initiators include (1) tertiary aliphatic amines such as methyl diethanol amine and triethanol amine; (2) aromatic amines such as amylparadimethylaminobenzoate, 2-n-butoxyethyl-4-(dimethylamino)benzoate, 2-(dimethylamino)ethylbenzoate, ethyl-4-(dimethylamino) benzoate and 2-ethylhexyl-4-(dimethylamino)benzoate; (3) (meth)acrylated amines such as EBECRYL™ 7100 and UVECRYL™ P104 and P115, all from UCB RadCure Specialties; and (4) amino-functional acrylate or methacrylate resin or oligomer blends such as EBECRYL™ 3600 or EBECRYL™ 3703, both from UCB RadCure Specialties. Combinations of the above four categories of co-initiators may also be used.

In the case of visible or UV radiation curing systems, the preferred amount of photoinitiator present in the disclosed coating systems can be from about 0.2 to about 15 wt. % of the non-volatile components. More preferably the photoinitiator can be from about 0.5 to about 10 wt. %, and most preferably the photoinitiator can be from about 0.75 to about 5 wt. % of the non-volatile components.

Other methods for curing the coating systems can be used in combination with methods described herein Such other curing methods include heat cure, chemical cure, anaerobic cure, moisture cure, oxidative cure, and the like. Such methods may require inclusion of a corresponding curing initiator or curing agent in the composition. For example, heat cure can be induced by peroxides, metal curing packages can induce an oxidative cure, or multifunctional amines (for example isophorone diamine) can effect a chemical crosslinking cure through Michael addition of amine groups onto acrylate reactive unsaturated groups. If these additional initiators are present in the coating system they typically make up about 0.1-12% by weight of the curable coating system. Means for effecting cures by such methods are known to those of skill in the art or can be determined using standard methods.

Other optional components for use in the coating systems herein are described in Koleske et al., Paint and Coatings Industry, April, 2003, pages 12-86. Typical performance enhancing additives that may be employed include surface active agents, pigments, colorants, dyes, surfactants, dispersants, defoamers, thickeners, heat stabilizers, leveling agents, coalescents, biocides, mildewcides, anti-cratering agents, curing indicators, plasticizers, fillers, sedimentation inhibitors, ultraviolet light absorbers, optical brighteners, and the like to modify properties.

The coating systems may also contain an optional coalescent and many coalescents are known in the art. The optional coalescent is preferably a low VOC coalescent such as is described in U.S. Pat. No. 6,762,230.

Exemplary coating systems that can be used in the coating systems are listed below. This is not intended to be an exhaustive list of examples of coating systems. The examples include the following compositions:

A One or more olefinic compounds (e.g., monomers, oligomers, or polymers) and one or more PVC dispersion resins; and B One or more olefinic compounds (e.g., monomers, oligomers, or polymers), one or more PVC dispersion resins and an initiator.

Composition A—An example of a coating system suitable for use in the invention includes a mixture of (i) olefinic monomers or oligomers, (e.g., trimethylolpropane triacrylate (TMPTA) (available from Sartomer) and (ii) a PVC dispersion (e.g., GEON 137, 171 or 172 from PolyOne Corporation or NORVINYL S6261, S6571, S7060 or S8060 from Hydro Polymers).

Composition B—An example of a coating system suitable for use in the invention includes a mixture of (i) olefinic monomers or oligomers, (e.g., trimethylolpropane tri-acrylate (TMPTA); (ii) a PVC dispersion (e.g., GEON 137, 171 or 172 from PolyOne Corporation or NORVINYL S6261, S6571, S7060 or S8060 from Hydro Polymers); and (iii) an initiator, (e.g., DAROCURE 1173 (D-1173).

The instant method includes applications of suitable coating systems which can be applied as a single layer or as multiple applications of at least one coating composition. The specific application and order of application of the selected coating compositions can be readily determined by a person skilled in the art of preparing or applying such compositions. Exemplary descriptions of these coating systems are provided below.

Specific application routes for preparing the coated articles include:

Apply a coating system, and subject the coating system to radiation cure (e.g., electron-beam or UV cure); and Apply a coating composition, apply one or more additional coating composition(s), and subject the resulting coating system to radiation cure (e.g., electron-beam or UV cure).

Accordingly, the disclosed articles can be prepared by applying the coating system as a single layer or the coating system can be applied as multiple layers. Coating compositions applied using multiple coating layers may allow mixing of the coating layers at an interface.

In any of the above application routes when there is a carrier (e.g., water or solvent) present in one of more of the compositions, the coated article may be subjected to quick drying to remove at least a portion of any carrier which may be present. The coating composition(s) are preferably applied at about 75 to 100% solids by weight and preferably at about 85 to 100% solids.

The coating systems may be applied by any number of application techniques including but not limited to brushing (e.g., using a brush coater), direct roll coating, reverse roll coating, flood coating, dip coating, vacuum coating, curtain coating and spraying. The various techniques each offer a unique set of advantages and disadvantages depending upon the substrate profile, morphology and tolerable application efficiencies. The disclosed coating systems can for example advantageously be applied to a cement fiberboard substrate by roll coating or spraying. Lower viscosities facilitate uniform film control. The applied film thickness may be controlled by varying the application rate.

A dry film thickness (DFT) of the coating system on the cement fiberboard substrate may for example be in the range of, but not limited to, about 0.2 to about 4 mil (about 0.005 to about 0.1 mm), more preferably about 0.3 to about 3 mil (about 0.008 to about 0.08 mm).

It is preferred that the coated articles are coated on at least one major surface with the coating system. More preferably, the coated articles are coated on a major surface and up to four minor surfaces including any edges. Most preferably, the coated articles are coated on all (e.g., both) major surfaces, and up to four minor surfaces including any edges.

Multiple layers of the disclosed coating systems may be applied. A primer (e.g., a latex-containing primer) or topcoat (e.g., a latex-containing topcoat) or both a primer and topcoat may be applied directly to the coating system. If desired this may be done at the site where the cement fiberboard substrate is manufactured.

The coating systems and compositions described herein may be used in place of or in addition to coatings that the prior art has categorized as "sealers," "primers" and "topcoats." However, the systems and compositions may not fit neatly into any category per se and such terms should not be limiting.

It is also noted that the disclosed coating systems and coating compositions can be used with other coating compositions such as those disclosed in the following applications: U.S. Application Ser. Nos. 60/764,103, 60/764,044 and 60/674,131, each filed Jan. 31, 2006, and 60/802,185, filed May 19, 2006.

All patents, patent applications, and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the spirit and scope of the invention.

What is claimed is:

1. A coated article, comprising:
   a cement fiberboard substrate; and
   a liquid radiation-curable coating system applied to the substrate, wherein the coating system comprises:
   a plastisol or organosol comprising one or more olefinic compounds and one or more polyvinyl chloride (PVC) dispersion resins containing resin particles suspended in the liquid and when cured provides the substrate with increased resistance to moisture uptake.

2. The article of claim 1, wherein the coating system includes two or more coating compositions that may be applied in two or more layers.

3. The article of claim 1, wherein the coating system further comprises an initiator system.

4. The article of claim 3, wherein the coating system comprises a UV photoinitiator.

5. The article of claim 1, wherein the coating system comprises a first composition comprising an olefinic compound and a second composition comprising a PVC dispersion resin.

6. The article of claim 5, wherein the coating system comprises a composition comprising both an olefinic compound and a PVC dispersion resin.

7. The article of claim 1, wherein the olefinic compound comprises a (meth)acrylate, vinyl, vinyl ether, allyl ether, vinyl ester, unsaturated oil, unsaturated fatty acid, or combination thereof.

8. The article of claim 7, wherein the olefinic compound comprises isobornyl (meth)acrylate, isodecyl (meth)acrylate, phenoxyethyl (meth)acrylate, trimethylolpropane tri(meth)acrylate, alkoxylated cyclohexane dimethanol di(meth)acrylate, trimethylolpropane ethoxylate tri(meth)acrylate, dipropylene glycol di(meth)acrylate, tripropylene glycol di(meth)acrylate, hexanediol di(meth)acrylate, tetrahydrofurfuryl (meth)acrylate, pentaerythritol tri(meth)acrylate, pentaerythritol tetra(meth)acrylate, ditrimethylolpropane tetra(meth)acrylate, propoxylated glycerol tri(meth)acrylate, beta-carboxyethyl (meth)acrylate, bisphenol A ethoxylate di(meth)acrylate, ethoxylated neopentyl glycol di(meth)acrylate, propoxylated neopentyl glycol di(meth)acrylate, or combination thereof.

9. The article of claim 8, wherein the olefinic compound comprises trimethylolpropane tri(meth)acrylate, bisphenol A ethoxylate di(meth)acrylate, propoxylated glycerol tri(meth)acrylate, trimethylolpropane ethoxylate tri(meth)acrylate, ditrimethylolpropane tetra(meth)acrylate, or combination thereof.

10. The article of claim 7, wherein the olefinic compound comprises a monomer.

11. The article of claim 7, wherein the olefinic compound comprises an oligomer.

12. The article of claim 1, wherein the PVC dispersion resin comprises resin particles in a liquid plasticizer and wherein the particles have an average particle diameter of about 0.1 µm to about 1.5 µm.

13. The article of claim 1, wherein a latex-containing primer or latex-containing topcoat is applied over the coating system and wherein the cement fiberboard substrate is in the form of a siding product.

14. The article of claim 1, wherein the coated article when radiation cured can withstand at least 30 freeze-thaw cycles.

15. The article of claim 14, wherein the coated article can withstand at least 75 freeze-thaw cycles.

16. The article of claim 15, wherein the coated article can withstand at least 175 freeze-thaw cycles.

17. The article of claim 1, wherein the coating system has a VOC of less than about 5% based on the total weight of the coating system.

18. The article of claim 17, wherein the coating system has a VOC of less than about 0.5% based on the total weight of the coating system.

19. A method for making a coated article, which method comprises:
providing a cement fiberboard substrate;
coating at least a portion of the substrate with a liquid radiation-curable coating system comprising a plastisol or organosol comprising one or more olefinic compounds and one or more polyvinyl chloride (PVC) dispersion resins containing resin particles suspended in the liquid; and
radiation-curing the coating thereby providing the substrate with increased resistance to moisture uptake.

20. The method of claim 19, comprising coating the substrate with a first coating composition comprising the one or more olefinic compounds followed by a second coating composition comprising one or more polyvinyl chloride (PVC) dispersion resins.

* * * * *